US012707330B2

(12) United States Patent
Jamkhandikar et al.

(10) Patent No.: US 12,707,330 B2
(45) Date of Patent: Aug. 11, 2026

(54) DYNAMIC CELL LOAD MANAGEMENT USING NEAR-RT RIC

(71) Applicant: Parallel Wireless, Inc., Nashua, NH (US)

(72) Inventors: Sunil Jamkhandikar, Pune (IN); Ravikiran Raje, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 18/739,314

(22) Filed: Jun. 10, 2024

(65) Prior Publication Data

US 2024/0414590 A1 Dec. 12, 2024

Related U.S. Application Data

(60) Provisional application No. 63/507,209, filed on Jun. 9, 2023.

(51) Int. Cl.

| | |
|---|---|
| ***H04W 52/34*** | (2009.01) |
| ***H04W 16/14*** | (2009.01) |
| ***H04W 16/18*** | (2009.01) |
| ***H04W 28/086*** | (2023.01) |
| *G01S 3/06* | (2006.01) |
| *G01S 3/14* | (2006.01) |
| *G01S 13/04* | (2006.01) |

(52) U.S. Cl.
CPC .................................. *H04W 28/086* (2023.05)

(58) Field of Classification Search
CPC ... H04W 28/086; H04W 52/34; H04W 16/18; H04W 16/14; G01S 3/14; G01S 3/06; G01S 13/04
USPC .......................................................... 709/238
See application file for complete search history.

(56) References Cited

U.S. PATENT DOCUMENTS

2017/0074962 A1* 3/2017 Badawy .................... G01S 3/38
2023/0284072 A1* 9/2023 Khemelevsky ... H04W 28/0861 370/230

OTHER PUBLICATIONS

LTE; Evolved Universal Terrestrial Radio Access Network (E-UTRAN); S1 Application Protocol (S1AP) (3GPP TS 36.413 version 15.3.0 Release 15), ETSI TS 136 413 V15.3.0 (Sep. 2018).
3rd Generation Partnership Project; Technical Specification Group Radio Access Network; Evolved Universal Terrestrial Radio Access (E-UTRA); Radio Resource Control (RRC); Protocol specification (Release 11), Jun. 2016.

* cited by examiner

*Primary Examiner* — Jude Jean Gilles
(74) *Attorney, Agent, or Firm* — Michael Y. Saji

(57) ABSTRACT

A system is shown for identifying cell user load in different quadrants (A quadrant is a logical division of the cell coverage into sectors) of the cell coverage and based on cell user load, light up additional cells in that quadrant which can handle the UE load and bring the cells when the load decreases after a particular defined threshold.

3 Claims, 13 Drawing Sheets

200

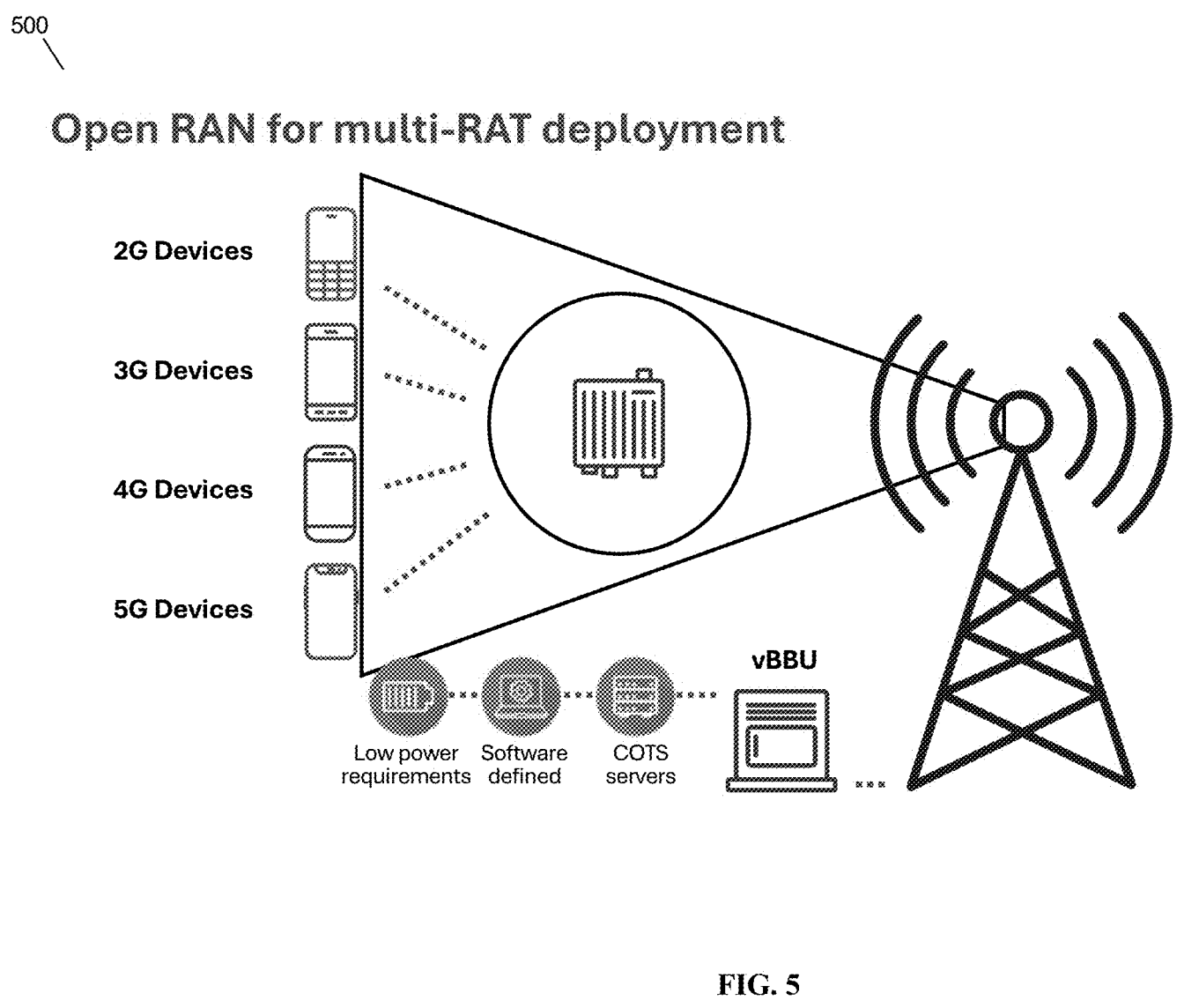

500

Open RAN for multi-RAT deployment

2G Devices

3G Devices

4G Devices

5G Devices vBBU

Low power requirements

Software defined

COTS servers

FIG. 5

DYNAMIC CELL LOAD MANAGEMENT USING NEAR-RT RIC

CROSS-REFERENCE TO RELATED APPLICATIONS

This application claims the benefit of priority under 35 U.S.C. § 119(e) to U.S. Provisional Patent Application No. 63/507,209, filed Jun. 9, 2023 and having the same title as the present application, which is also hereby incorporated by reference in its entirety for all purposes.

The present application also hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850US01); US20170272330A1 (PWS-71850US02); and Ser. No. 15/713,584 (PWS-71850US03). This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019. This application also incorporates by reference the U.S. patent application filed 2022 Aug. 16 with application Ser. No. 17/819,950 and title "4G/5G Open RAN CU-UP High Availability Solution"; the U.S. patent application filed 2022 Dec. 19 with application Ser. No. 18/068,520 and title "CU-CP High Availability"; and the U.S. patent application, filed 2022 Dec. 29 with application Ser. No. 18/148,432 and title "Singleton Microservice High Availability." The following documents are also incorporated by reference in their entirety: the most recent version of the 3rd Generation Partnership Project (3GPP) Technical Specifications (TS) 36.413, 36.331, and 38.855 as of Jun. 9, 2023.

BACKGROUND

Angle of Arrival (AoA) is a technique for positioning for radio signals. Using AoA, typically a measurement of a difference in direction of a single radio wave is performed as the signal is received by multiple independent antennas. As the signal is received, a signal phase is captured (when using IQ samples), and these are used to calculate an angle of arrival. This is more feasible thanks to the availability of MIMO antennas in modern systems, and as a result, in addition to 4G standard methods for measuring positioning, AoA has been added to the set of algorithms available for use in 5G for determining the position of a UE Round trip time (RTT) is a related positioning technique involving capturing differential receive times across multiple antennas that is also available in 5G and is equivalent for purposes of the present application.

Open RAN is the movement in wireless telecommunications to disaggregate hardware and software and to create open interfaces between them. Open RAN also disaggregates RAN from into components like RRH (Remote Radio Head), DU (Distributed Unit), CU (Centralized Unit), Near-RT (Real-Time) and Non-RT (Real-Time) RIC (RAN Intelligence Controller). Below is the Open RAN architecture as defined by ORAN alliance.

CU function is split into CU-CP (Control Plane) and CU-UP (User Plane) function to provide Control and User Plane separation. Open RAN solution needs to support: Open Interfaces between different functions; Software based functions; Cloud Native functions; Intelligence support via support for xApps/rApps; 3rd Party RRHs, Disaggregated functions; White Box COTS hardware support; and Data Path separated from Control plane traffic.

SUMMARY

In one embodiment, a method of operation of a cellular telecommunications network is disclosed, comprising: separating a cellular coverage area into a plurality of quadrants; receiving a signal from a UE, determining an angle of arrival of the signal received from the UE; assigning the UE to one of the plurality of quadrants based on the angle of arrival of the signal received from the UE; performing load management of the cellular telecommunications network based on the assignment of the UE. The load management further comprises activating or deactivating cells, carriers, or radio access technologies (RATs). The load management may be performed at a near-real time (Near-RT) radio access network (RAN) intelligent controller (RIC).

BRIEF DESCRIPTION OF THE DRAWINGS

FIG. 5 is a multi-RAT openRAN-compliant RAN architecture, in accordance with some embodiments.

DETAILED DESCRIPTION

Figure 1:
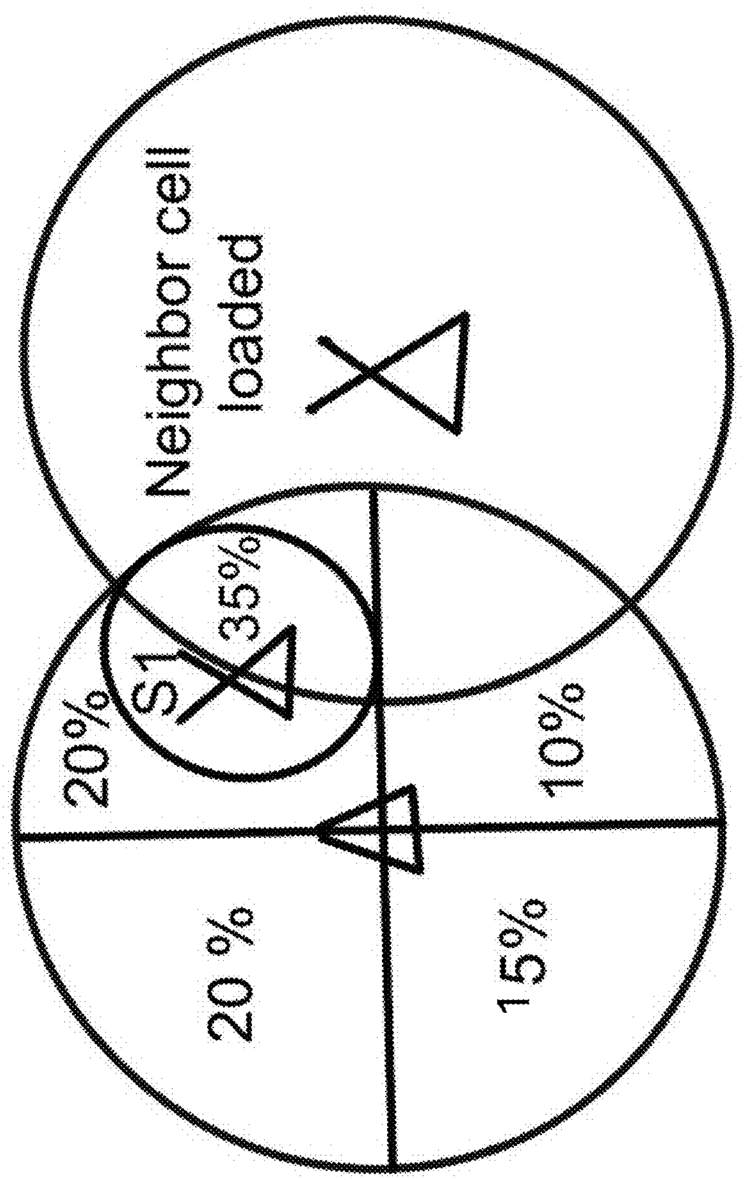
FIG. 1 is a schematic diagram of dynamic cell load management, in accordance with some embodiments.

A system is described for identifying cell user load in different quadrants (A quadrant is a logical division of the cell coverage into sectors) of the cell coverage and based on cell user load, light up additional cells in that quadrant which can handle the UE load and bring the cells when the load decreases after a particular defined threshold.

Abbreviations Used in This Disclosure:

- CU-CP: This node handles RRC and the control plane part of the PDCP protocol. This node communicates with DU over F1-C interface and with CU-UP over E1 interface as defined in 3GPP specifications.
- CU-UP/s: This node handles user plane part of PDCP protocol and SDAP protocol. It communicates with CU-CP over E1 interface and with DU over F1-U interface.
- SMO (Service management and orchestration): control of infra structure component like CPU/Memory and scale up and scale down operations.
- FCAPS (Fault, Configuration, Security, Performance, Accounting) management of Open-RAN elements (gNB-CU-CP, gNB-CU-UP, gNB-DU)
- AMF/SMF: 3GPP defined 5G core network element for control signaling.
- UPF: 3GPP defined 5G core network element for data-plane traffic.
- DU (gNB-DU): 3GPP defined 5G access network element.
- Downlink time difference of arrival (DL-TDOA): A new reference signal known as the positioning reference signal (PRS) is introduced in Release 16 for the UE to perform downlink reference signal time difference (DL RSTD) measurements for each base station's PRSs. These measurements are reported to the location server.
- Uplink time difference of arrival (UL-TDOA): The Release-16 sounding reference signal (SRS) is enhanced to allow each base station to measure the uplink relative time of arrival (UL-RTOA) and report the measurements to the location server.
- Downlink angle-of-departure (DL-AoD): The UE measures the downlink reference signal receive power (DL RSRP) per beam/gNB. Measurement reports are used to determine the AoD based on UE beam location for each gNB. The location server then uses the AoDs to estimate the UE position.
- Uplink angle-of-arrival (UL-AOA): The gNB measures the angle-of-arrival based on the beam the UE is located in. Measurement reports are sent to the location server.
- Multi-cell round trip time (RTT): The gNB and UE perform Rx-Tx time difference measurement for the signal of each cell. The measurement reports from the UE and gNBs are sent to the location server to determine the round trip time of each cell and derive the UE position.
- Enhanced cell ID (E-CID). This is based on RRM measurements (e.g. DL RSRP) of each gNB at the UE. The measurement reports are sent to the location server.

Problem and Solution

In traditional macro cell deployments, when there is UE load increases or decreases within cell coverage there is no intelligent handling of the UE load. There also can be scenarios where the number of users is disproportionately higher in a specific area of the cell coverage, thus causing the cell to be overloaded, and causing network issues to users in other areas of the cell's coverage, which can be a problem.

We propose using a dynamic cell load management system that allows us to find the load in a particular quadrant of the cell coverage based on number of UEs coming in from that quadrant using AoA of the signal of that UE. (A quadrant is a logical division of the cell coverage in to sectors.)

Finding the number of UEs coming from a particular quadrant may involve, in some embodiments, a processing stage that is in the PHY that either processes or passes on the AoA of the UE. Phase of a signal may be considered, in some embodiments. In particular, where 3GPP standards do not exist, processing may be performed using existing or new reference signals that are not present in the 3GPP spec, such as, specifically, for pre-Rel. 16 2G, 3G, 4G radio access technologies (RATs). In other embodiments, 3GPP standard methods such as measuring DL-TDOA using the position reference signal (PRS) per Rel. 16. In some embodiments, GPS, A-GPS, GNSS, A-GNSS, or other satellite positioning methods may be used. In some embodiments, AoA is used for localizing the UEs to a geographic location and the term quadrant is meant to signify an arbitrary denotation of location; in other embodiments, determining an angle and a distance relative to the location of a single base station is performed and this information is used to assign the UEs to quadrants. In some embodiments a 3GPP reference signal is used for AoA localization.

In particular, the 3GPP standard has included angle measurement as new positioning methods in 5G. The Angle of Arrival (AoA) is the angle measurement method that can enjoy the new capabilities in 5G systems to enhance the positioning down to centimeter level accuracy. Release 16 and 17 include this functionality. In some embodiments, various positioning techniques such as roundtrip time (RTT), angle of departure (AoD), time difference of arrival (TDOA) may also be used as equivalents in place of or in conjunction with AoA. In some embodiments, either uplink and/or downlink signals may be considered. Exemplary positioning methods and systems are described in, e.g., 3GPP TR 38.855 (for regulatory use cases such as 911). Various granularities of positioning are understood to be able to be used with the present disclosure.

In some embodiments, velocity may also be considered for purposes of calculating UE load in a quadrant, as well as for other purposes. When velocity is considered, multiple positioning references may also be considered. In some embodiments, when velocity is considered, a velocity above a certain threshold may be used and a future quadrant position for a given UE may be considered for purposes of the present algorithm.

FIG. 1 shows an exemplary cell loading pattern, in accordance with some embodiments. The primary cell on the left of the diagram is shown as having four quadrants, having loading of 10%, 15%, 20%, and 20%. (SW, SE, NW, NE), where the percentages correspond to a percentage ratio of UEs camped on the cell. The NE quadrant also includes an additional 35% of load within an inner circle area around inactive cell S1, for a total of 55% in the NE quadrant. The neighbor cell is also shown and is also understood to be (heavily) loaded.

In operation, in accordance with the present disclosure, in some embodiments, when it is determined that a new cell S1 is available for bringup, and once a threshold is exceeded, and assuming there are no contraindications to bringup of new cell S1, the new cell S1 is brought up by the Near RT-RIC, thereby relieving load on both the original cell and on the neighbor cell.

When the cell is loaded as well as the neighbour cell is loaded and cannot handle the additional users of the cell, then, in some embodiments, we can find load in a particular quadrant which is high and then we can power on the additional cells around that quadrant intelligently so that resource utilization is optimum and UE load handling can be done. This can be done by coordinating between the Near-RT RIC and in some cases the Non-RT RIC.

Thresholds per quadrant and per cell can be pre-defined and power on of cells based on those thresholds can be an intelligent decision taken by NRT-RIC to light up the new cell, in some embodiments. Other factors may also be considered for making this decision to light up a new cell, in some embodiments. In some embodiments, the threshold may be a ratio threshold and may be a ratio of the number of UEs in the highest loaded quadrant to the number of UEs in the whole cell, or a ratio of the number of UEs in the highest loaded quadrant to the least loaded quadrant, or another similar ratio. This will often be useful in dense ultra urban areas where cells can be installed and kept to handle load dynamically.

When a cell reaches pre-defined maximum capacity threshold (e.g., 80% of real maximum capacity), the network, in some embodiments the Near-RT RIC, may bring up additional cells, carriers, bands, RATs, or other resources in the particular quadrant where number of users is greater, to better handle call load in that quadrant. When load is reduced the opposite may be performed and resources may be turned off.

When there is a need to power down the cells which are lit up when load reduces in quadrant, we can gradually bring down power of new small cell S1 until the UEs start handing over to the main cell. The trigger to bring down newly lit cells can be, in some embodiments, when threshold for cell utilization of newly lit cell goes below a pre-set threshold (e.g., When threshold for cell utilization for newly lit cell goes below 25% and main cell has capacity to handle the 25% user load without overloading itself).

This can be intelligently calculated and triggered by Near RT-RIC, in some embodiments, and/or in conjunction with Non-RT RIC, in some embodiments. This can be implemented as an xApp, in some embodiments, and/or an rApp, in some embodiments. Where the abbreviation NRT RIC is used in this disclosure, it may be understood to mean Near-RT RIC, unless otherwise indicated.

The newly lit up cell will have intelligent RF power controlled by the NRT-RIC so that it will not cause Rf interference with the neighbouring cell and other quadrants of the main cell.

When we light up a cell the transmit power of the newly lit cell will be dynamically controlled and the neighbouring cell around the lit up cell will also be dynamically power controlled so that there is no interference. The newly lit cell will also be taking UEs from the neighbouring cell.

In some embodiments, each of these triggering processes may be a separate xApp. In some embodiments, different thresholds and/or xApps may be used for different quadrants, sectors, cells, frequencies, etc. In some embodiments, a gateway or base station centralized unit (including but not limited to a 3GPP O-RAN CU) could be used to perform the functions specified throughout this disclosure. In some embodiments, a network node that performs the corresponding function for a non-4G/5G RAT may be used to perform the functions specified herein, such as an RNC or a BTS/BSC or a non-3GPP centralizing gateway.

In some embodiments, these processes may be performed once every TTI (transport time interval) or once every few seconds or once every few minutes or once every hour or at another interval as desired. In some embodiments, the periodicity of these processes may be adjusted based on historical traffic patterns, either manually or automatically or by a combination thereof (e.g., machine learning).

In some embodiments, the Near-RT RIC may be manually or automatically configured to have information about which base station corresponds to which quadrant.

Figure 2:
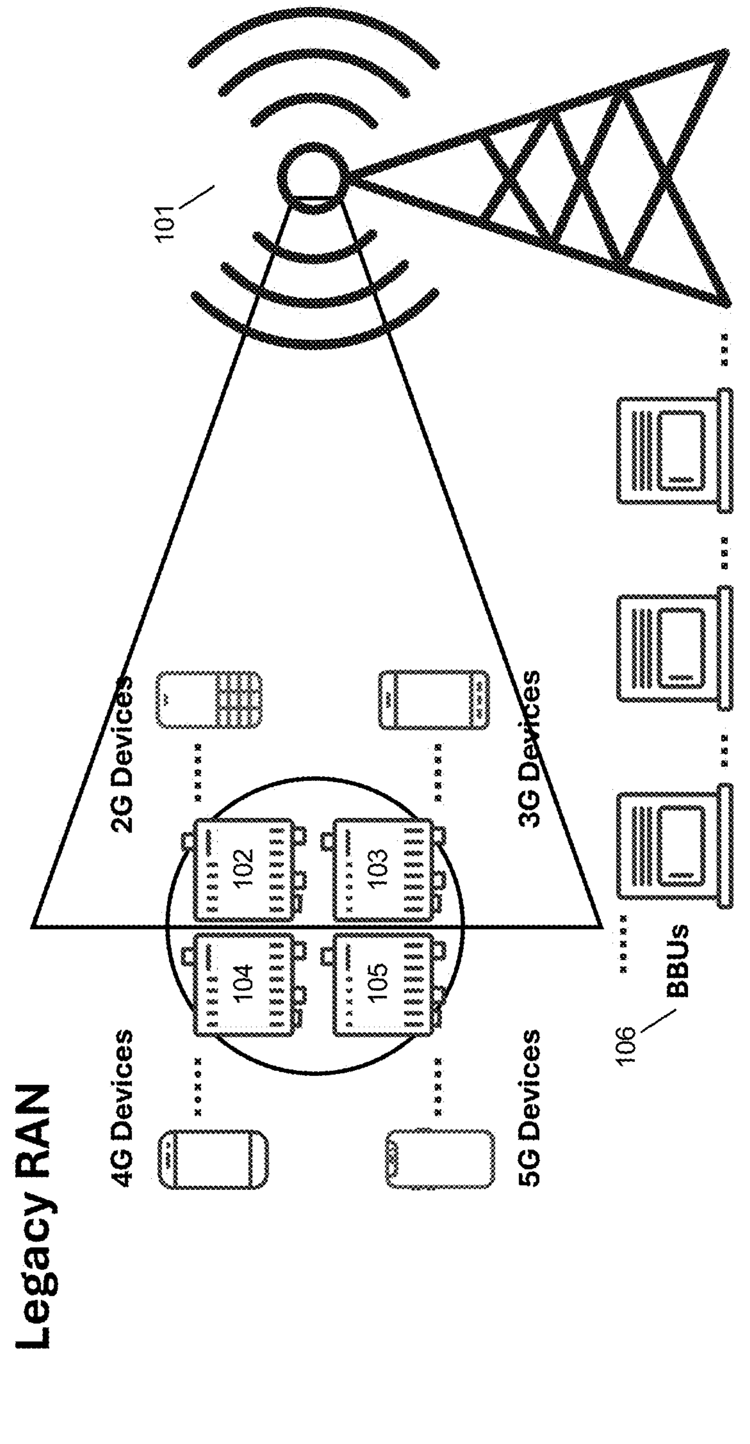
FIG. 2 is a schematic diagram of a legacy radio access network (RAN), in accordance with some embodiments.

FIG. 2 is a schematic diagram of a legacy RAN deployment architecture, in accordance with some embodiments. Radio tower 201 is used for co-locating a 2G base station 202, 3G base station 203, 4G base station 204, and 5G base station 205, each individual RAT base station having its own radio(s) and processing. To support and enable the radios to perform their necessary functions, including PHY, MAC, backhaul, RRC, etc., several base band units (BBUs) 206 are typically located at the base of the tower and are connected to the individual RAT base stations using a physical cable. This cable itself introduces signal loss and heat/power wastage. The BBUs themselves are expensive to purchase and deploy to the site, are expensive to operate given their need for real estate, HVAC and electrical support, and are expensive also to maintain, as a typical maintenance activity requires a dedicated truck roll to the site with a skilled technician.

Figure 3:
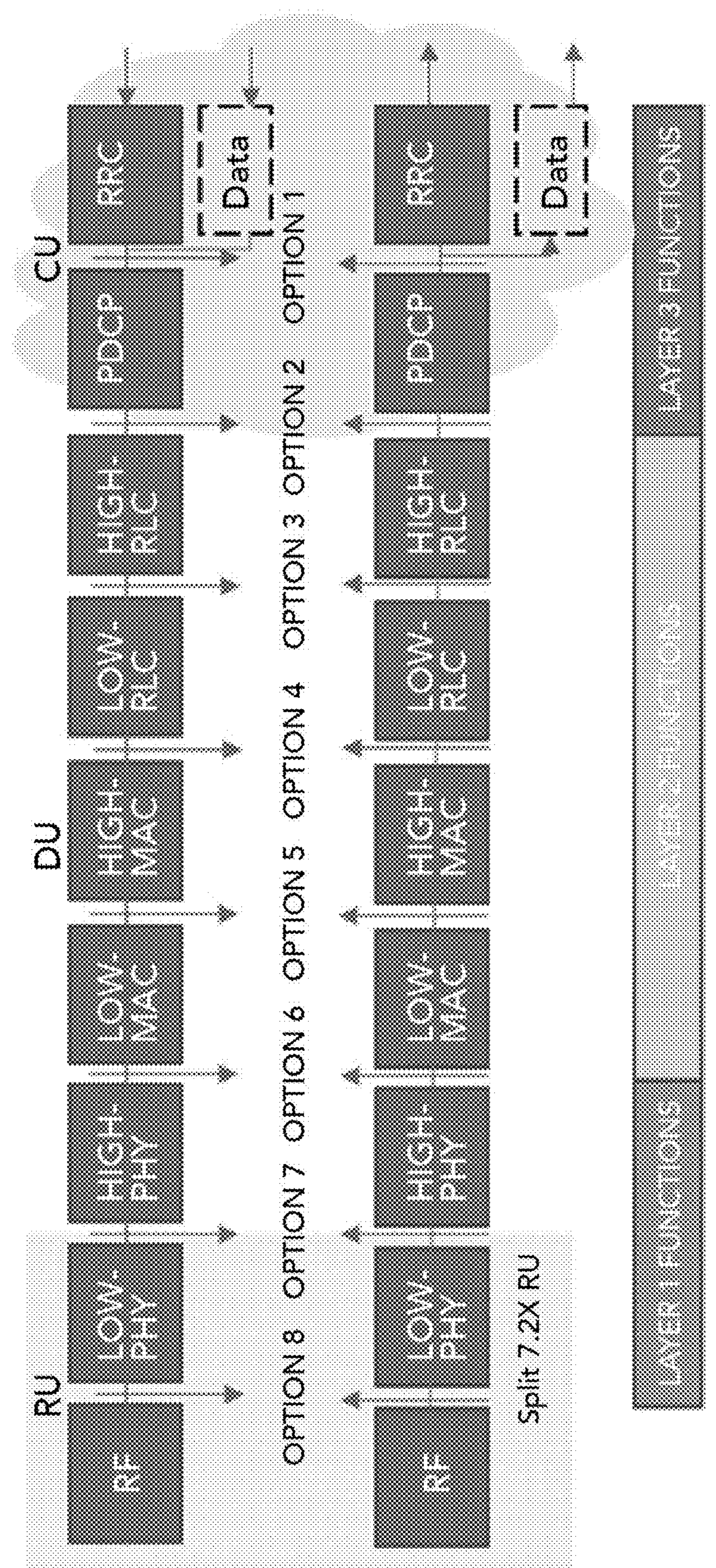
FIG. 3 is a schematic diagram of RAN functional splits, in accordance with some embodiments.

FIG. 3 shows a schematic diagram of radio functional splits showing split 7.2X RU as well as other splits. The use of these functional splits is encouraged by ORAN. 5G New Radio (NR) was designed to allow for disaggregating the baseband unit (BBU) by breaking off functions beyond the Radio Unit (RU) into Distributed Units (DUs) and Centralized Units (CUs), which is called a functional split architecture. This concept has been extended to 4G as well.

RU: This is the radio hardware unit that coverts radio signals sent to and from the antenna into a digital signal for transmission over packet networks. It handles the digital front end (DFE) and the lower PHY layer, as well as the digital beamforming functionality. 5G RU designs are supposed to be inherently intelligent, but the key considerations of RU design are size, weight, and power consumption Deployed on site.

DU: The distributed unit software that is deployed on site on a COTS server. DU software is normally deployed close to the RU on site and it runs the RLC, MAC, and parts of the PHY layer. This logical node includes a subset of the eNodeB (eNB)/gNodeB (gNB) functions, depending on the functional split option, and its operation is controlled by the CU.

CU: The centralized unit software that runs the Radio Resource Control (RRC) and Packet Data Convergence Protocol (PDCP) layers. The gNB consists of a CU and one DU connected to the CU via Fs-C and Fs-U interfaces for CP and UP respectively. A CU with multiple DUs will support multiple gNBs. The split architecture lets a 5G network utilize different distributions of protocol stacks between CU and DUs depending on midhaul availability and network design. It is a logical node that includes the gNB functions like transfer of user data, mobility control, RAN sharing (MORAN), positioning, session management etc., except for functions that are allocated exclusively to the DU. The CU controls the operation of several DUs over the midhaul interface. CU software can be co-located with DU software on the same server on site.

When the RAN functional split architecture (FIG. 4) is fully virtualized, CU and DU functions runs as virtual software functions on standard commercial off-the-shelf (COTS) hardware and be deployed in any RAN tiered datacenter, limited by bandwidth and latency constraints.

Option 7.2 (shown) is the functional split chosen by the O-RAN Alliance for 4G and 5G. It is a low-level split for ultra-reliable low-latency communication (URLLC) and near-edge deployment. RU and DU are connected by the eCPRI interface with a latency of ~100 microseconds. In O-RAN terminology, RU is denoted as O-RU and DU is denoted as O-DU. Further information is available in US20200128414A1, hereby incorporated by reference in its entirety.

Figure 4:
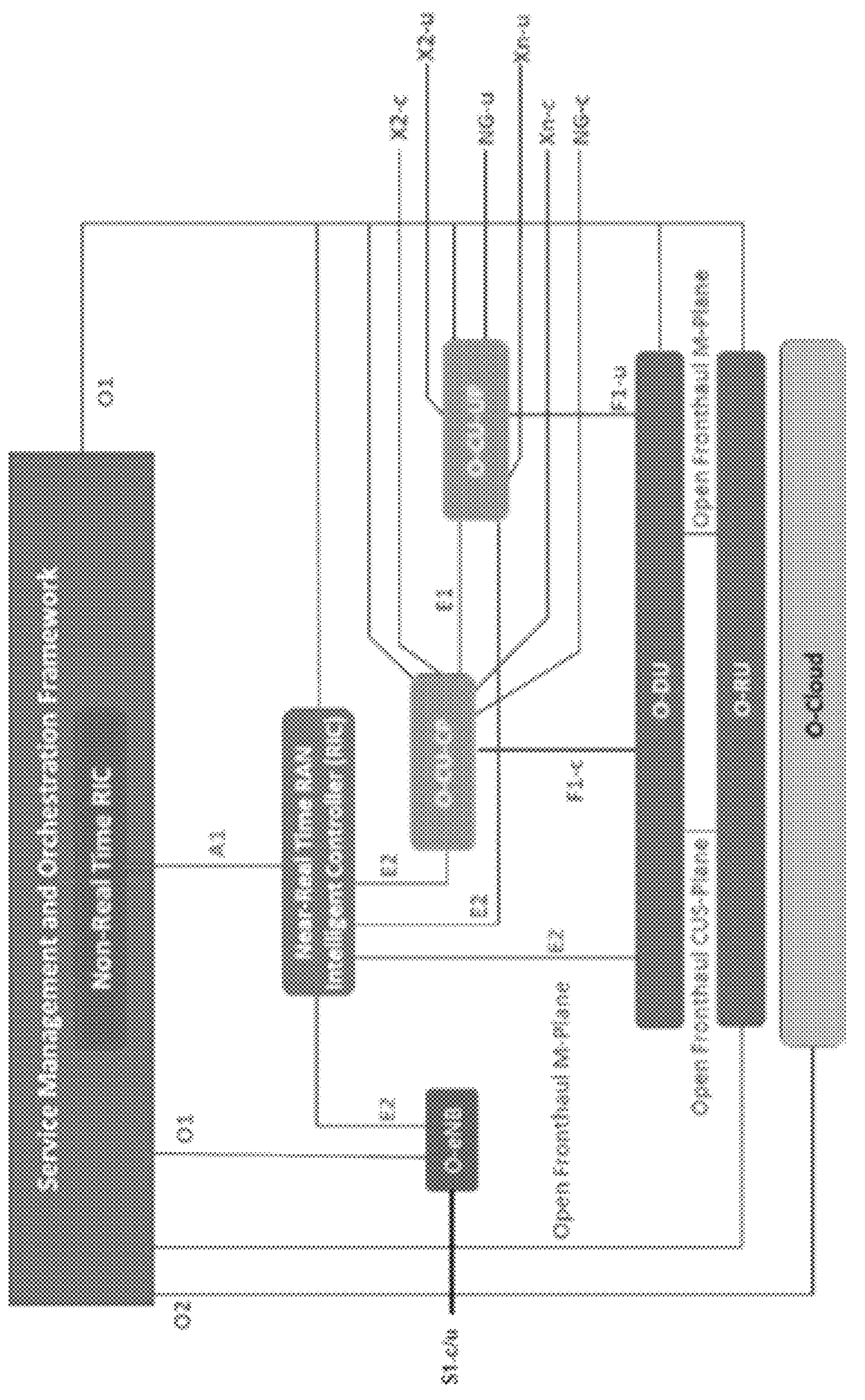
FIG. 4 is an OpenRAN-compliant core network architecture, in accordance with some embodiments.

FIG. 4 is a schematic diagram of an Open RAN 4G/5G deployment architecture, in accordance with some embodiments. The O-RAN deployment architecture includes an O-DU and O-RU, as described above with respect to FIG. 3, which together comprise a 5G base station in the diagram as shown. The O-CU-CP (central unit control plane) and O-CU-UP (central unit user plane) are ORAN-aware 5G core network nodes. An ORAN-aware LTE node, O-eNB, is also shown. As well, a near-real time RAN intelligent controller is shown, in communication with the CU-UP, CU-CP, and DU, performing near-real time coordination as well, a non-real time RAN intelligent controller is shown, receiving inputs from throughout the network and specifically from the near-RT RIC and performing service management and orchestration (SMO), in coordination with the operator's network (not shown). Absent from the ORAN network concept is any integration of 2G, 3G. Also absent is any integration of a 2G/3G/4G DU or RU. The present disclosure is enabled for use with the disclosed architecture in this figure. Various nodes, for example the CU-CP and CU-UP nodes (here marked O-CU-CP and O-CU-UP to denote OpenRAN-compatible nodes), use SCTP and may use the methods and systems described herein for SCTP high availability. The node marked "Infrastructure—COTS/White Box/Peripheral Hardware and Virtualization Layer" may, in some embodiments, use the containerized architecture described herein and may use SCTP high availability features to provide this functionality to any of the higher layers and nodes, e.g., O-XXX, Near-RT RIC, etc. of this architecture as shown in the figure, in some embodiments.

FIG. 5 is a schematic diagram of a multi-RAT RAN deployment architecture, in accordance with some embodiments. FIG. 5 shows a radio tower with a remote radio head (RRH) supporting multiple RATs, 2G/3G/4G/5G, but without requiring four generations of radio base stations as shown in FIG. 2. Instead, one or more software-upgradable, remotely configurable base stations is coupled to radio heads and filters that are able to operate on the appropriate frequencies for 2G, 3G, 4G, and 5G RATs. The multiple BBUs located at the bottom of the tower in FIG. 2 have been replaced with one or more vBBUs, baseband units that are rearchitected to use modern virtualization technologies. FIG. 5 can be enabled using a technology like CPRI or eCPRI, which enables digitization and transfer of radio I/Q samples for further processing at a BBU or vBBU.

Where virtualization is described herein, one having skill in the cloud technology arts would understand that a variety of technologies could be used to provide virtualization, including one or more of the following: containers, Kubernetes, Docker, hypervisors, virtual machines, hardware virtualization, microservices, AWS, Azure, etc. In a preferred embodiment, containerized microservices coordinated using Kubernetes are used to provide baseband processing for multiple RATs as deployed on the tower.

The inventors have appreciated that the use of the 3GPP model for functional splits is flexible and may be used to provide deployment flexibility for multiple RATs, not just 5G. Functional splits can be used in conjunction with cloud and virtualization technology to perform virtualization of, e.g., the RU, DU, and CU of not just 5G but also 4G, 3G, 2G, etc. This enables the use of commodity off-the-shelf servers, software-defined networking that can be rapidly upgraded remotely, and lower power requirements by using modern hardware compared to legacy hardware. A single RRH supports a 5G RAT with an Option 7.2 split, a 4G RAT with an Option 7.2 split, and 2G+3G with an Option 8 split. With the Option 7.2 split, the PHY is split into High PHY and Low PHY. For option 7-2, the uplink (UL), CP removal, fast Fourier transform (FFT), digital beamforming (if applicable), and prefiltering (for PRACH (Physical Random Access Channel) only) functions all occur in the RU. The rest of the PHY is processed in the DU. For the downlink (DL), the inverse FFT (iFFT), CP addition, precoding functions, and digital beamforming (if applicable) occur in the RU, and the rest of the PHY processing happens in the DU. This is the preferred ORAN split for 5G, and can also be used for 4G. For 2G+3G, an Option 8 split is preferred, where only RF will be performed at the RU and further processing (PHY/MAC/RLC/PDCP) is performed at the vBBU. This is desirable because the processing and latency requirements for 2G and 3G are lower, and are readily fulfilled by a BBU or VBBU.

Continuing with FIG. 5, a fronthaul link connects the RRH to a DU+CU, which runs a variety of virtualized RAT processing on a vBBU machine. The fronthaul link may be CPRI or eCPRI, or another similar interface. The DU+CU may be located at the base of the tower or at a further remove as enabled by different latency envelopes; typically this will be close to the tower for a 5G deployment. In some embodiments, a HetNet Gateway (HNG), which performs control and user plane data aggregation and gateway services, may be the next destination via the backhaul connection; the HNG may disaggregate the different RAT communications to be directed to different RAT cores (i.e., a 2G core, a 3G core, a 4G core, a 5G core and so on). In some embodiments and in certain situations, an HNG may perform virtualization or interworking of aggregated communications such that, e.g., 2G communications may be interworked to 4G IP voice communications and routed through the 4G core. In some embodiments, the HNG may perform virtualization of one or more cores such that the communications may not need to terminate at a RAT-specific core; this feature may be combined with interworking in some embodiments. In some embodiments, no aggregator may be present and the vBBU may directly route communications to each RAT's individual core.

Figure 6:
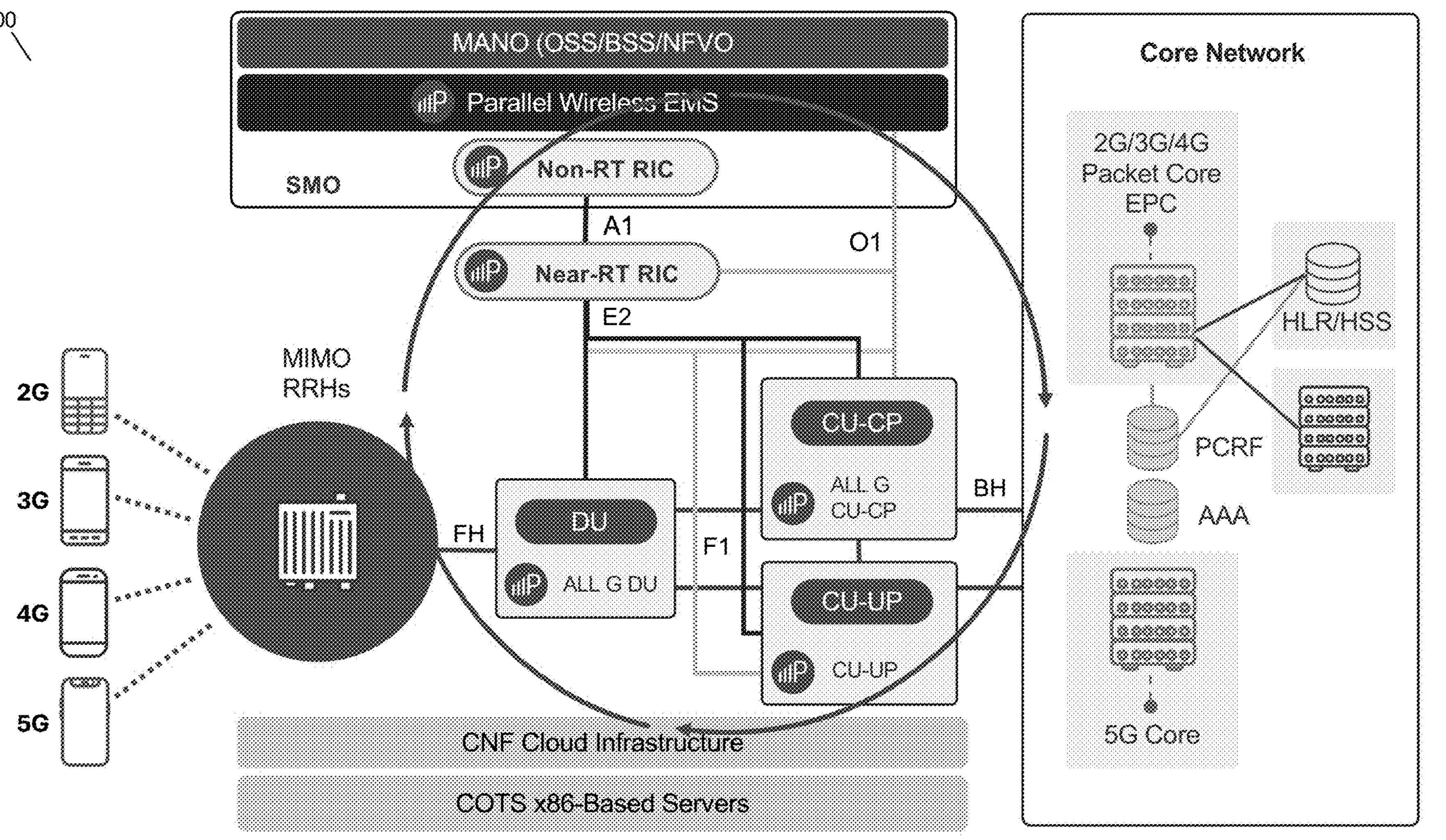
FIG. 6 is a multi-RAT openRAN-compliant network architecture, in accordance with some embodiments.

FIG. 6 is a further schematic diagram of a multi-RAT RAN deployment architecture, in accordance with some embodiments. Multiple generations of UE are shown, connecting to RRHs that are coupled via fronthaul to an all-G Parallel Wireless DU. The all-G DU is capable of interoperating with an all-G CU-CP and an all-G CU-UP. Backhaul may connect to the operator core network, in some embodiments, which may include a 2G/3G/4G packet core, EPC, HLR/HSS, PCRF, AAA, etc., and/or a 5G core. In some embodiments an all-G near-RT RIC is coupled to the all-G DU and all-G CU-UP and all-G CU-CP. Unlike in the prior art, the near-RT RIC is capable of interoperating with not just 5G but also 2G/3G/4G.

The all-G near-RT RIC may perform processing and network adjustments that are appropriate given the RAT. For example, a 4G/5G near-RT RIC performs network adjustments that are intended to operate in the 100 ms latency window. However, for 2G or 3G, these windows may be extended. As well, the all-G near-RT RIC can perform configuration changes that takes into account different network conditions across multiple RATs. For example, if 4G is becoming crowded or if compute is becoming unavailable, admission control, load shedding, or UE RAT reselection may be performed to redirect 4G voice users to use 2G instead of 4G, thereby maintaining performance for users. As well, the non-RT RIC is also changed to be a near-RT RIC, such that the all-G non-RT RIC is capable of performing network adjustments and configuration changes for individual RATs or across RATs similar to the all-G near-RT RIC. In some embodiments, each RAT can be supported using processes, that may be deployed in threads, containers, virtual machines, etc., and that are dedicated to that specific RAT, and, multiple RATs may be supported by combining them on a single architecture or (physical or virtual) machine. In some embodiments, the interfaces between different RAT processes may be standardized such that different RATs can be coordinated with each other, which may involve interworking processes or which may involve supporting a subset of available commands for a RAT, in some embodiments.

(Open RAN) is a movement in wireless telecommunications to Open Radio Access Network disaggregate hardware and software and to create open interfaces between them. Open RAN also disaggregates RAN from into components like RRH (Remote Radio Head), DU (Distributed Unit), CU (Centralized Unit), Near-RT (Real-Time) and Non-RT (Real-Time) RIC (RAN Intelligence Controller) Open RAN has published specifications for the 4G and 5G radio access technologies (RATs).

The first RAT may be 4G or 5G, and The radio fronthaul interface may be Common Public Radio Interface (CPRI) or Enhanced Common Public Radio Interface (eCPRI). The second RAT may be 2G or 3G, and The radio fronthaul interface may be Common Public Radio Interface (CPRI) or Enhanced Common Public Radio Interface (eCPRI). The first and the second functional RU may be colocated on a single physical device and virtualized to operate as separate processes. The first and the second functional RU may be instantiated as virtualized containers.

The multi-RAT non-RT RIC may be coupled to a network operator service management and orchestration (SMO) functionality. The method may further comprise a multi-RAT central unit control plane (CU-CP) and multi-RAT central unit user plane (CU-UP).

Figure 7:
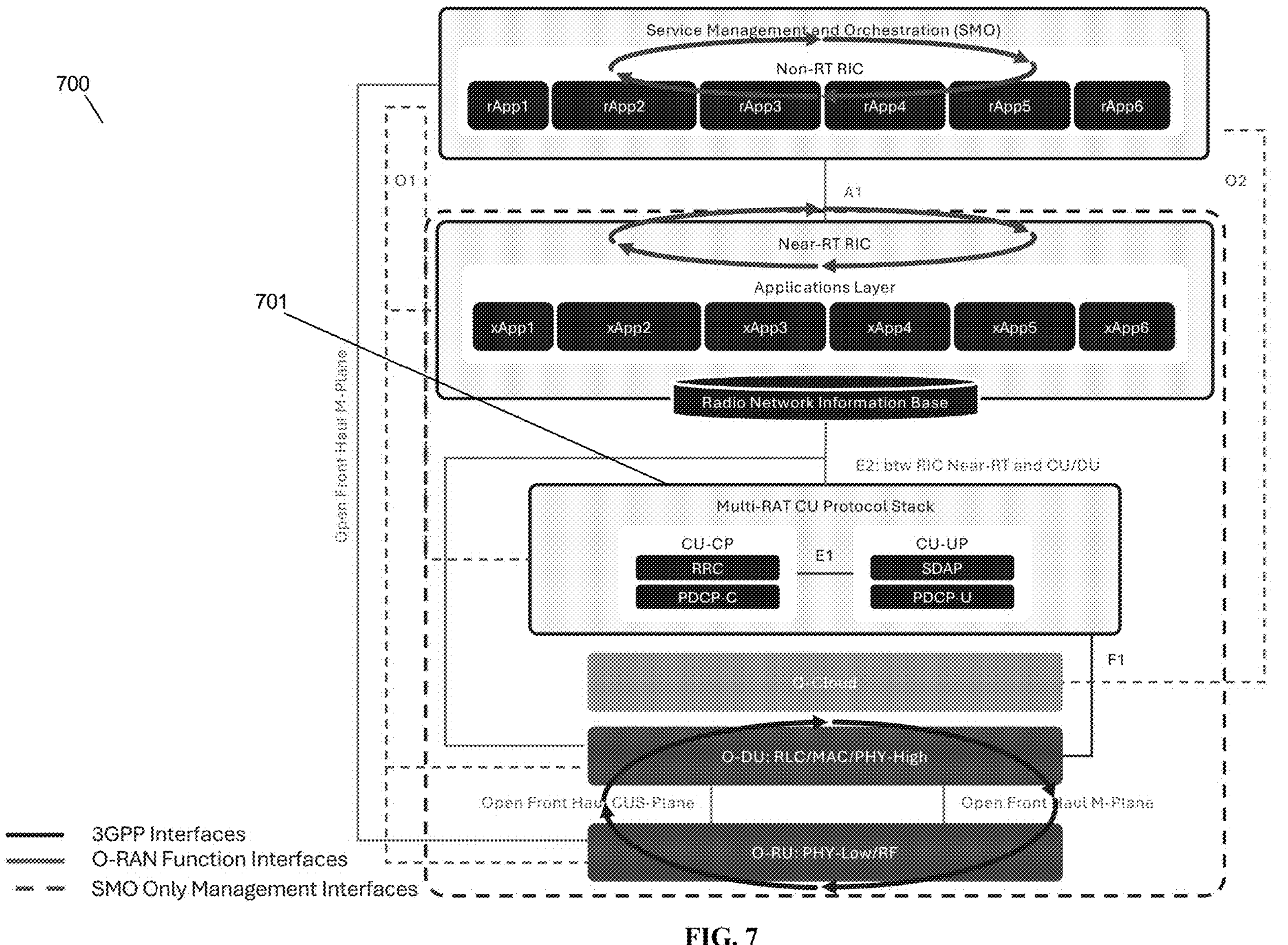
FIG. 7 is a multi-RAT openRAN-compliant network architecture showing xApps, in accordance with some embodiments.

FIG. 7 is a further schematic diagram of a multi-RAT RAN deployment architecture, in accordance with some embodiments. The multi-RAT CU protocol stack 701 is configured as shown and enables a multi-RAT CU-CP and multi-RAT CU-UP, performing RRC, PDCP, and SDAP for all-G. As well, some portion of the base station (DU or CU) may be in the cloud or on COTS hardware (O-Cloud), as shown. Coordination with SMO and the all-G near-RT RIC and the all-G non-RT RIC may be performed using the A1 and O2 function interfaces, as shown and elsewhere as specified by the ORAN and 3GPP interfaces for 4G/5G.

Figure 8:
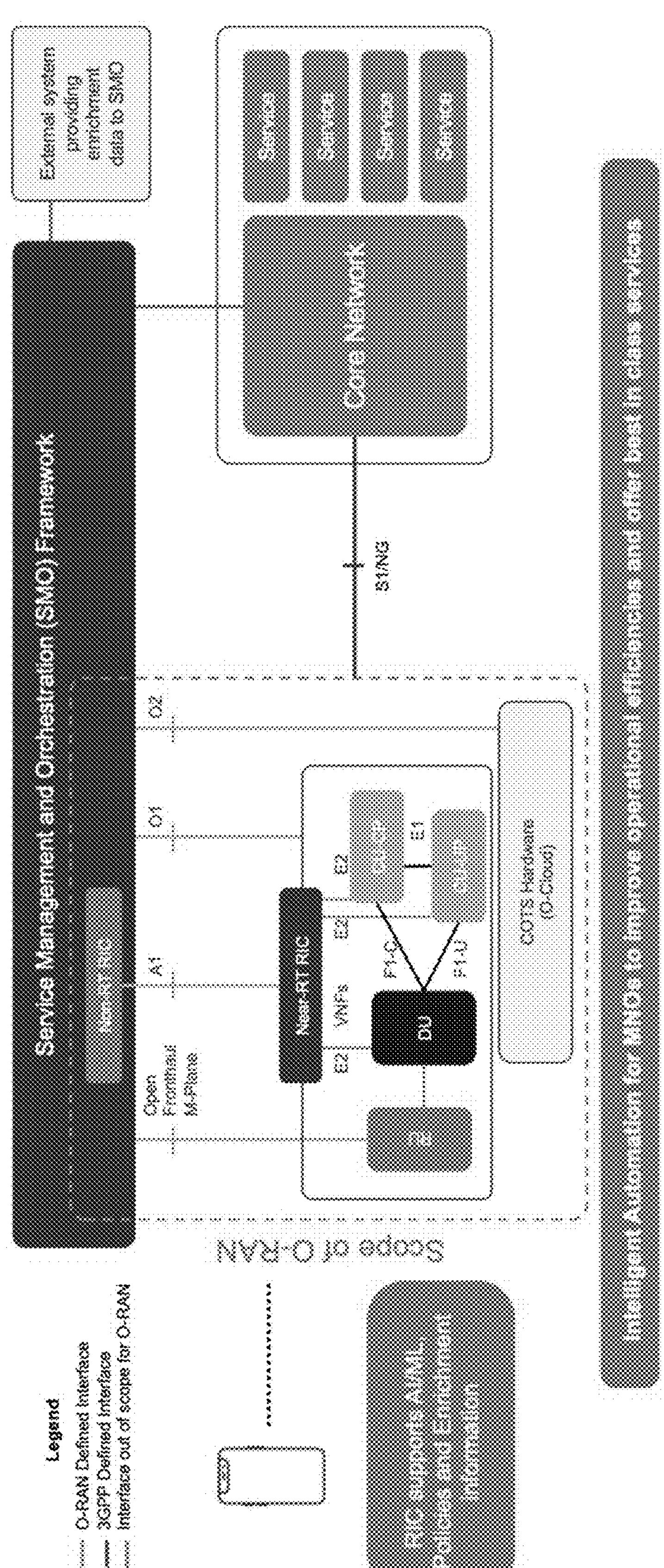
FIG. 8 is a multi-RAT openRAN-compliant network architecture showing a Service Management and Orchestration (SMO) framework, in accordance with some embodiments.

FIG. 8 is a further schematic diagram of a multi-RAT RAN deployment architecture, in accordance with some embodiments. This schematic diagram shows the use of the near/non-RT RIC to provide AI/ML (artificial intelligence and machine learning) policies and enrichment across Gs. This may also involve an SMO framework that is outside of the RAN, that is interfaced through the non-RT RIC, and may also involve an external system providing enrichment data to the SMO, as well as the core network and any services thereon, in some embodiments. The all-G Non-RT RIC serves as the integration point for performing network optimizations and adjustments that take into account any offline processes for AI/ML that involve adjustments that operate outside of the UE latency window (for 4G/5G~100 ms), in some embodiments.

Figure 9:
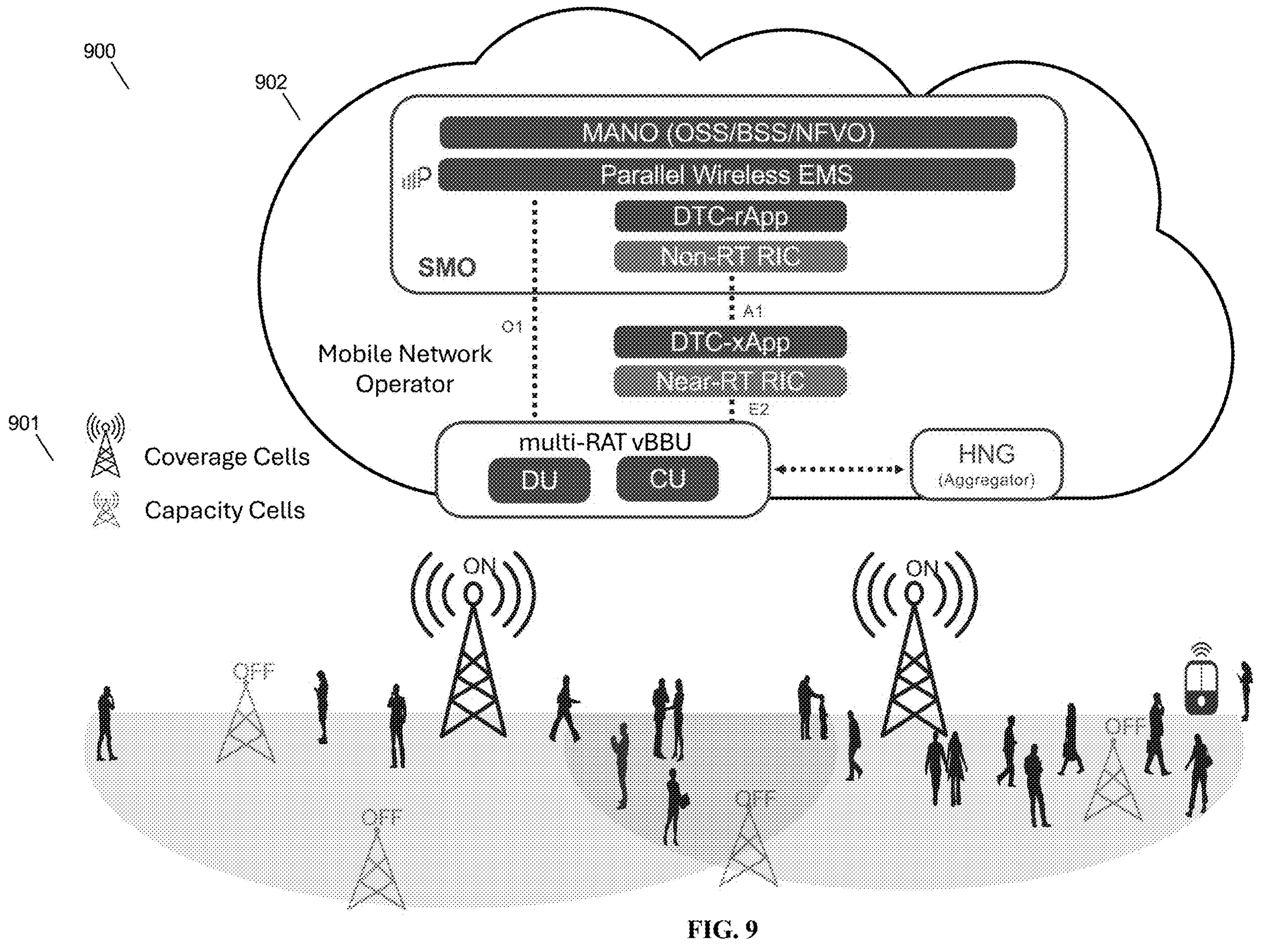
FIG. 9 is a multi-RAT openRAN-compliant network architecture in operation, in accordance with some embodiments.

FIG. 9 is a schematic diagram of a multi-RAT RAN deployment in operation, in accordance with some embodiments. Diagram 901 is a schematic diagram of users in proximity to a variety of cells, labeled coverage cells and capacity cells. Coverage cells provide users with a connection to the network that is durable, typically located at a high tower; this type of connection may not, however, enable high bandwidth given the large number of users supported at such cells. Capacity cells support a smaller number of users and use different radio technologies to enable high throughput to users. Capacity and coverage cells are enabled to trade off users as needed to maintain the needs of the network and the users as well. The diagram shows that while there are several capacity cells available in the network, they are all turned off.

Diagram 902 is a schematic diagram of the operator network, in accordance with some embodiments. A multi-RAT vBBU is in communication with a near-RT RIC and a non-RT RIC, as well as a Parallel Wireless element management system (EMS), which provides the system with awareness about active network nodes, as well as a MANO (OSS/BSS/NFVO) for network operational capabilities. The coverage and capacity cells shown in 901 are in communication with the all-G near-RT RIC and all-G non-RT RIC. Network functions are managed by applications, called xApps when running on the near-RT RIC and rApps when running on the non-RT RIC, and these applications are in communication with each other and aware of the network conditions through information available at the systems on which they are running.

In operation, for some embodiments, for example, when a coverage cell is heavily loaded, an rApp on the non-RT RIC and an xApp on the near-RT RIC coordinate to identify a mitigation, which can include identifying an appropriate capacity cell to activate; activating the cell; and handing over users from the coverage cell to the newly active cell. In another example, in some embodiments, in the case that admission control is identified as causing too many users to be admitted to the network at the same time, throttling may be performed. Monitoring of network load and a subsequent instruction to perform throttling may be initiated at the near-RT RIC using an xApp, in some embodiments. This may be a multi-RAT activity and this may involve monitoring of network load for a first RAT and an instruction to perform throttling for a second RAT, in some embodiments.

Figure 10:
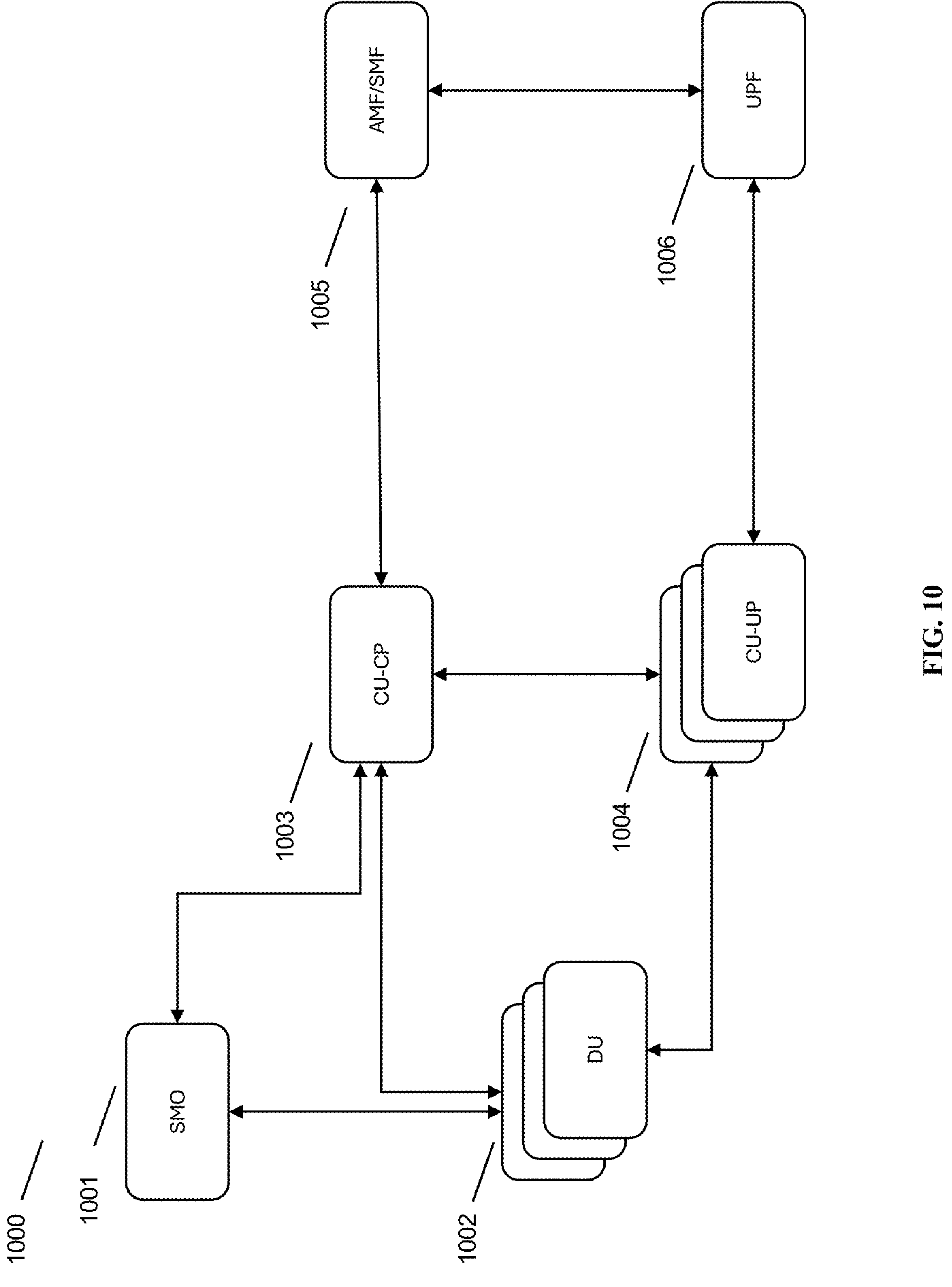
FIG. 10 is a schematic diagram of a CU-CP and a CU-UP in a multi-RAT openRAN-compliant network architecture, in accordance with some embodiments.

FIG. 10 shows a schematic diagram 1000 of a CU-CP Open RAN architecture, in accordance with a 5G architecture. CU-CP 1003 is in communication with a plurality of DUs 1002, with one or more CU-UPs 1004, service management and orchestration node (SMO) 1001, and AMF/SMF 1005. UPF 1006 is also in communication with AMF/SMF and CU-UP.

Figure 11:
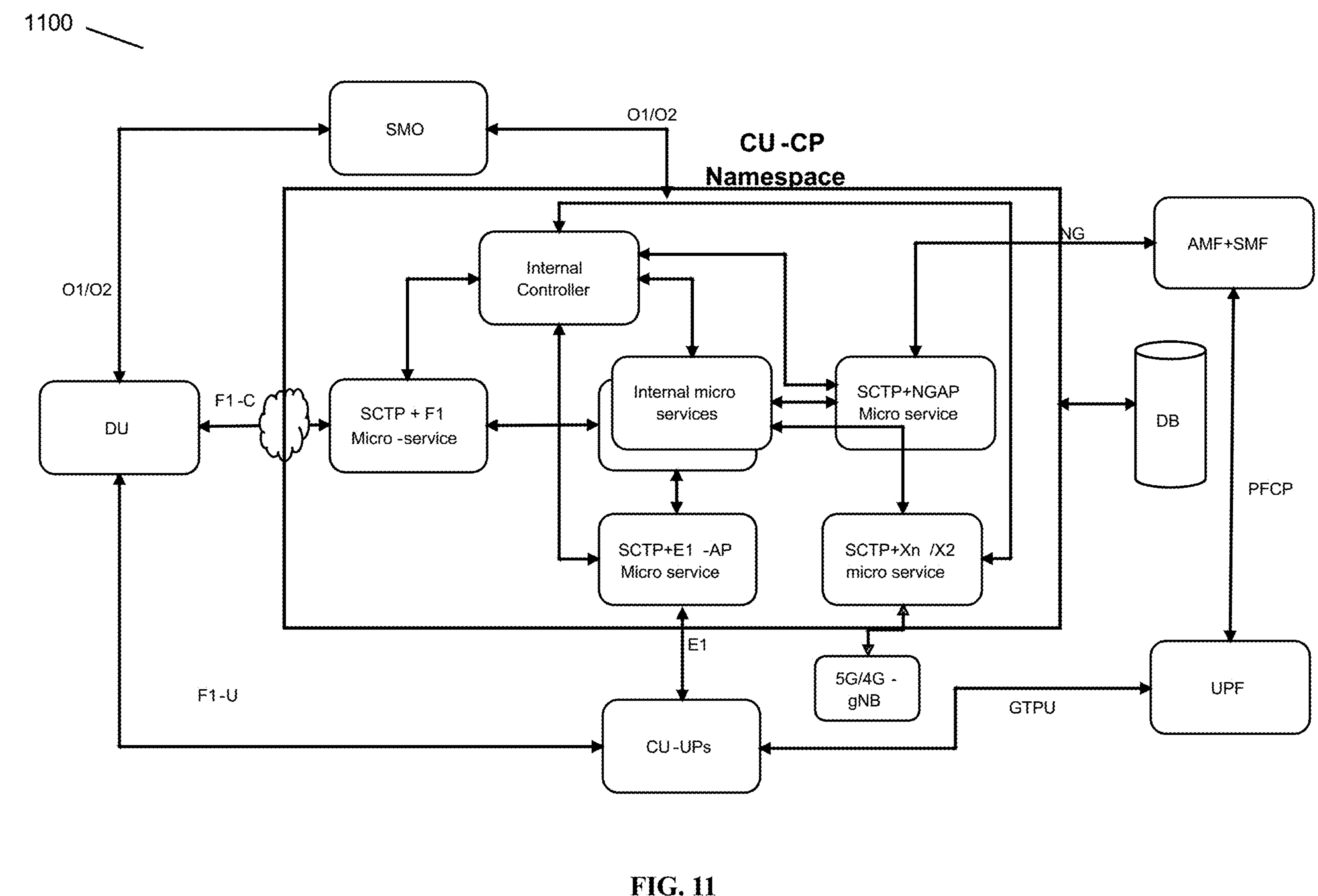
FIG. 11 is a schematic diagram of a CU-CP namespace, in accordance with some embodiments.

FIG. 11 shows a CU-CP internal logical architecture and internal nodes shown as microservices, in accordance with some embodiments. A variety of microservices provide the benefits of a microservices-based architecture, such as massively parallel processing, restart and management and availability, advanced monitoring, etc. This microservices architecture enables 4G and 5G, as shown, and can be readily extended to 2G and 3G as well (not shown). All of these nodes can use microservices, in some embodiments. However, although a microservice architecture provides high availability and scalability for stateless services seamlessly, it is noted that a session created on SCTP association can be lost if one of the SCTP pods (microservices) crashes and existing connection are not restored in time-bound manner.

Figure 12:
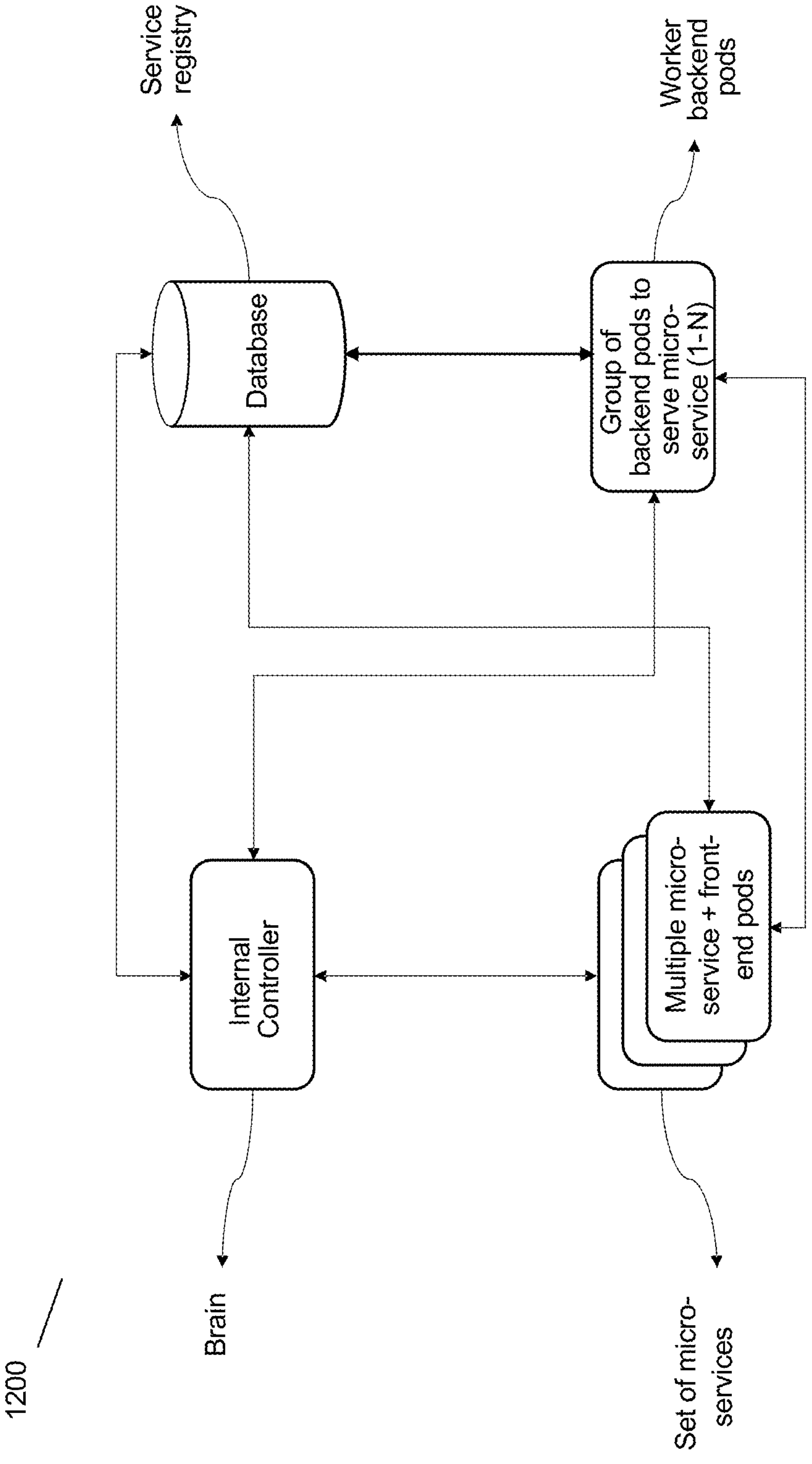
FIG. 12 is a schematic diagram of an SCTP microservice, in accordance with some embodiments.

FIG. 12 is a schematic diagram of a microservice control architecture, in accordance with some embodiments. Shown is a schematic diagram showing a pod microservice logical architecture with front and back-end pods, in accordance with some embodiments. A plurality of front-end pods for terminating connections and back-end pods for handling and processing traffic is in communication with a database; the database handles registration of the pods as described below. Other nodes, such as peer nodes, interface with the microservice via a particular service IP, and routing is performed within the microservice to the front end pods and back end pods, in some embodiments by a routing pod.

Figure 13:
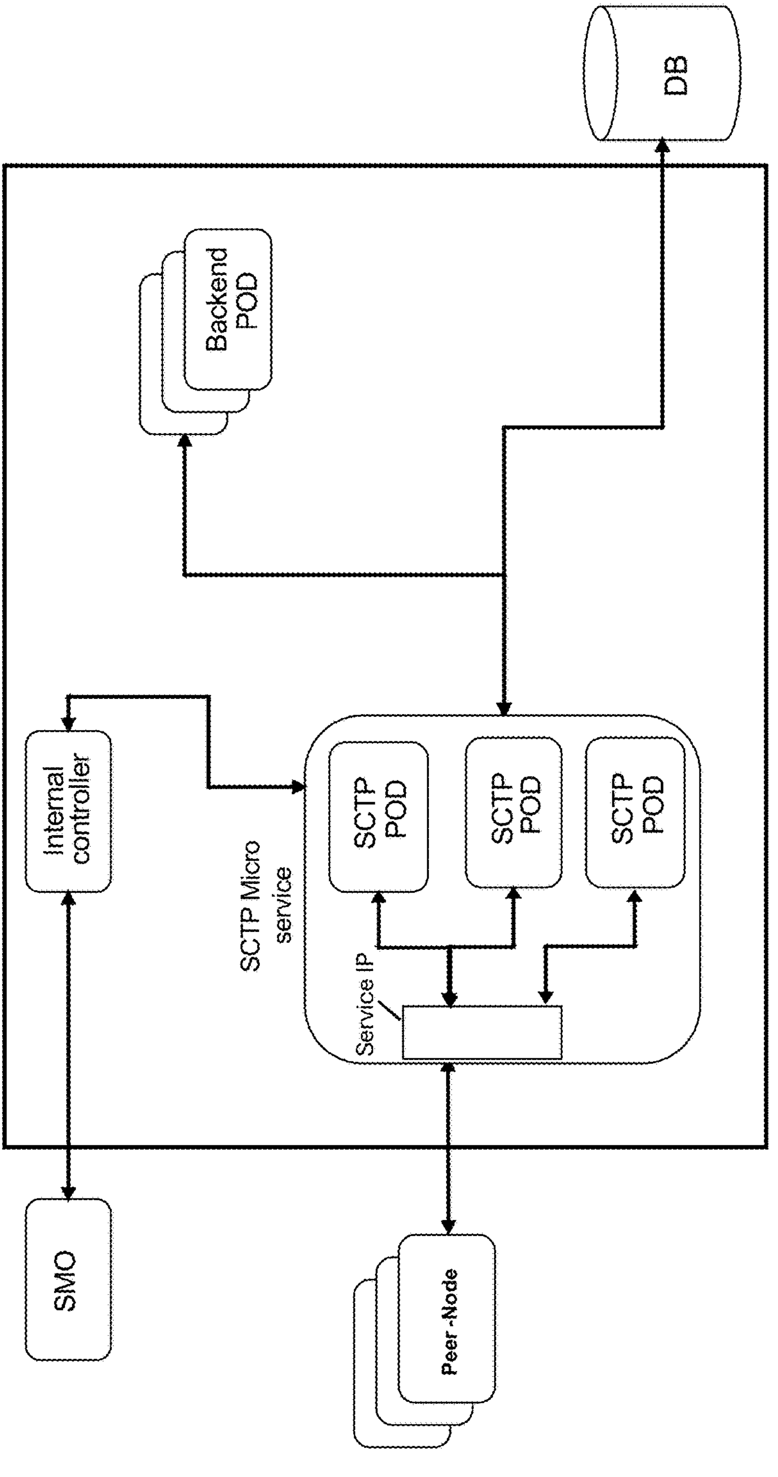
FIG. 13 is a schematic diagram of an SCTP microservice with failover, in accordance with some embodiments.

FIG. 13 is a schematic diagram of an SCTP microservice, in accordance with some embodiments. An active-active model is shown, wherein one microservice is the primary and another microservice is the backup, with both being active and the backup ready to take over at any time.

Additional Embodiments

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods are described in reference to 3GPP, one of skill in the art would understand that these systems and methods could be adapted for use with other wireless standards or versions thereof.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 or ARM microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

Although the present disclosure discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality. Where the term "all-G" is used herein, it is understood to mean multi-RAT (having at least two radio access technologies).

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method of operation of a cellular telecommunications network, comprising:

separating a cellular coverage area into a plurality of quadrants;

receiving a signal from a UE;

determining an angle of arrival of the signal received from the UE;

assigning the UE to one of the plurality of quadrants based on the angle of arrival of the signal received from the UE;

performing load management of the cellular telecommunications network based on the assignment of the UE.

2. The method of claim 1, wherein the load management further comprises activating or deactivating cells, carriers, or radio access technologies (RATs).

3. The method of claim 1, wherein the load management is performed at a near-real time (Near-RT) radio access network (RAN) intelligent controller (RIC).

* * * * *